(12) United States Patent
Wu (10) Patent No.: US 10,284,565 B2
(45) Date of Patent: May 7, 2019

(54) SECURITY VERIFICATION METHOD, APPARATUS, SERVER AND TERMINAL DEVICE (71) Applicant: ALIBABA GROUP HOLDING LIMITED, George Town, Grand Cayman (KY)

(72) Inventor: Yanping Wu, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 50 days.

(21) Appl. No.: 14/817,574

(22) Filed: Aug. 4, 2015

(65) Prior Publication Data

US 2016/0044045 A1 Feb. 11, 2016

(30) Foreign Application Priority Data

Aug. 5, 2014 (CN) .............................. 201410381484

(51) Int. Cl.
*H04L 29/06* (2006.01)
*G06F 21/31* (2013.01)

(52) U.S. Cl.
CPC ............ *H04L 63/105* (2013.01); *G06F 21/31* (2013.01); *H04L 63/08* (2013.01); *H04L 63/20* (2013.01)

(58) Field of Classification Search
CPC ....... H04L 63/105; H04L 63/08; H04L 63/20; G06F 21/31

(Continued)

(56) References Cited

U.S. PATENT DOCUMENTS 7,512,802 B2 3/2009 Minemura
7,949,881 B2 5/2011 Imura
(Continued)

FOREIGN PATENT DOCUMENTS

CN 102281138 A 12/2011
CN 103023638 A 4/2013
(Continued)

OTHER PUBLICATIONS

Olivier Benoit et al., "*Mobile Terminal Security*," Report 2004/158, Cryptology ePrint Archive, http://eprint.iacr.org/2004/158, Jul. 2004 (24 pgs.).

(Continued)

*Primary Examiner* — John B King
(74) *Attorney, Agent, or Firm* — Finnegan, Henderson, Farabow, Garrett & Dunner, LLP (57) ABSTRACT

A security verification method is provided. The method includes receiving a security verification request from a terminal device, sending verification information to the terminal device in response to the security verification request, and receiving first converted verification information from the terminal device. The first converted verification information may be generated by converting the verification information according to a preset verification rule. The method may further include determining whether the first converted verification information matches with second converted verification information. The second converted verification information may be generated by converting the verification information according to the preset verification rule. The method may further include determining that a user associated with the terminal device passes security verification if the first converted verification information matches with the second converted verification information.

12 Claims, 9 Drawing Sheets

(58) Field of Classification Search
USPC .......................................................... 726/1
See application file for complete search history.

(56) References Cited

U.S. PATENT DOCUMENTS

| | | | |
|---|---|---|---|
| 8,489,880 B1 | 7/2013 | Gagnon et al. | |
| 8,667,287 B2 | 3/2014 | Bichsel et al. | |
| 2005/0144484 A1* | 6/2005 | Wakayama | G06F 21/36 726/19 |
| 2007/0185820 A1 | 8/2007 | Talker | |
| 2008/0109873 A1 | 5/2008 | Kulkarni et al. | |
| 2009/0044022 A1 | 2/2009 | Singh | |
| 2010/0005181 A1 | 1/2010 | Zhang | |
| 2012/0005734 A1 | 1/2012 | Ogawa | |
| 2012/0254027 A1 | 10/2012 | Kanngard | |
| 2014/0298431 A1 | 10/2014 | Kim et al. | |
| 2015/0172290 A1 | 6/2015 | Lai | |

FOREIGN PATENT DOCUMENTS

| | | |
|---|---|---|
| CN | 103246574 A | 8/2013 |
| CN | 103544074 A | 1/2014 |
| EP | 1860620 A2 | 11/2007 |
| EP | 2916510 A1 | 9/2015 |
| WO | WO 2013/167043 A2 | 11/2013 |
| WO | WO 2014/090059 A1 | 6/2014 |
| WO | WO-2016/022555 A1 | 2/2016 |

OTHER PUBLICATIONS

Marc Barisch et al., "*Security and Privacy Enabiers for Future Identity Management Systems*" Future Network & Mobile Summit 2010 Conference Proceedings, Jun. 16-18, 2010 (10 pgs.).
PCT International Search Report and Written Opinion dated Oct. 30, 2015, issued in corresponding International Application No. PCT/US2015/043601 (15 pages).
First Chinese Office Action issued in Chinese Application No. CN201410381484.9, dated Dec. 28, 2017, 12 pages.
First Chinese Search Report issued in Chinese Application No. CN201410381484.9, dated Dec. 17, 2017, 2 pages.

* cited by examiner

SECURITY VERIFICATION METHOD, APPARATUS, SERVER AND TERMINAL DEVICE

CROSS-REFERENCE TO RELATED APPLICATION

This application is based upon and claims priority to Chinese Patent Application No. 201410381484.9, filed Aug. 5, 2014, the entire contents of which are incorporated herein by reference.

TECHNICAL FIELD

The present disclosure generally relates to the field of communication technology and, more particularly, to a security verification method, a security verification apparatus, a server and a terminal device.

BACKGROUND

Along with the emergence of smart devices and network applications, a user may access various network applications through application clients installed in a terminal device. To conduct an online transaction using a network application, the user is often required to perform identity authentication, member registration, or the like. For example, an application server may send verification information to the terminal device possessed by the user in a text message or an email. The user may then input a verification code carried in the verification information to pass security verification of the application server and obtain access to the network application.

The verification code carried in the verification information generally includes simple numerals. For example, during an online banking transaction, a server of the banking system may send a verification text message formed by 6 digits of numerals to the application client, and after the user inputs the 6 digits of numerals correctly, the user can complete the online banking transaction. However, since simple plaintext numeral information is included in the verification information, a malicious third party can easily steal the verification information through a Trojan. The conventional security verification is often found to be unreliable and produces a low level of security for accessing the network applications.

SUMMARY

The present disclosure provides a security verification method. Consistent with some embodiments, the method includes receiving a security verification request from a terminal device, sending verification information to the terminal device in response to the security verification request, and receiving first converted verification information from the terminal device. The first converted verification information may be generated by converting the verification information according to a preset verification rule. The method may further include determining whether the first converted verification information matches with second converted verification information. The second converted verification information may be generated by converting the verification information according to the preset verification rule. The method may further include determining that a user associated with the terminal device passes security verification if the first converted verification information matches with the second converted verification information.

Consistent with some embodiments, this disclosure provides another security verification method. The method includes sending a security verification request to a server, receiving verification information from the server, and acquiring first converted verification information. The first converted verification information may be generated by converting the verification information according to a preset verification rule. The method may further include sending the first converted verification information to the server for determining whether a user passes security verification.

Consistent with some embodiments, this disclosure provides a security verification apparatus. The apparatus includes a receiving unit configured to receive a security verification request from a terminal device, and a sending unit configured to send verification information to the terminal device in response to the security verification request. The receiving unit may be further configured to receive first converted verification information from the terminal device, and the first converted verification information may be generated by converting the verification information according to a preset verification rule. The apparatus may further include a verification unit configured to determine whether the first converted verification information matches with second converted verification information. The second converted verification information may be generated by converting the verification information according to the preset verification rule. The verification unit may be further configured to determine that a user associated with the terminal device passes security verification if the first converted verification information matches with the second converted verification information.

Consistent with some embodiments, this disclosure provides another security verification apparatus. The apparatus includes a sending unit configured to send a security verification request to a server, a receiving unit configured to receive verification information from the server, and an acquiring unit configured to acquire first converted verification information. The first converted verification information may be generated by converting the verification information according to a preset verification rule. The sending unit may be further configured to send the first converted verification information to the server for determining whether a user passes security verification.

Consistent with some embodiments, this disclosure provides a server. The server includes a processor and a memory for storing instructions executable by the processor. The processor may be configured to receive a security verification request from a terminal device, send verification information to the terminal device in response to the security verification request, and receive first converted verification information from the terminal device. The first converted verification information may be generated by converting the verification information according to a preset verification rule. The processor may be further configured to determine whether the first converted verification information matches with second converted verification information. The second converted verification information may be generated by converting the verification information according to the preset verification rule. The processor may be further configured to determine that a user associated with the terminal device passes security verification if the first converted verification information matches with the second converted verification information.

Consistent with some embodiments, this disclosure provides a terminal device. The terminal device includes a processor and a memory for storing instructions executable by the processor. The processor may be configured to send a security verification request to a server, receive verification information from the server, and acquire first converted verification information. The first converted verification information may be generated by converting the verification information according to a preset verification rule. The processor may be further configured to send the first converted verification information to the server for determining whether a user passes security verification.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
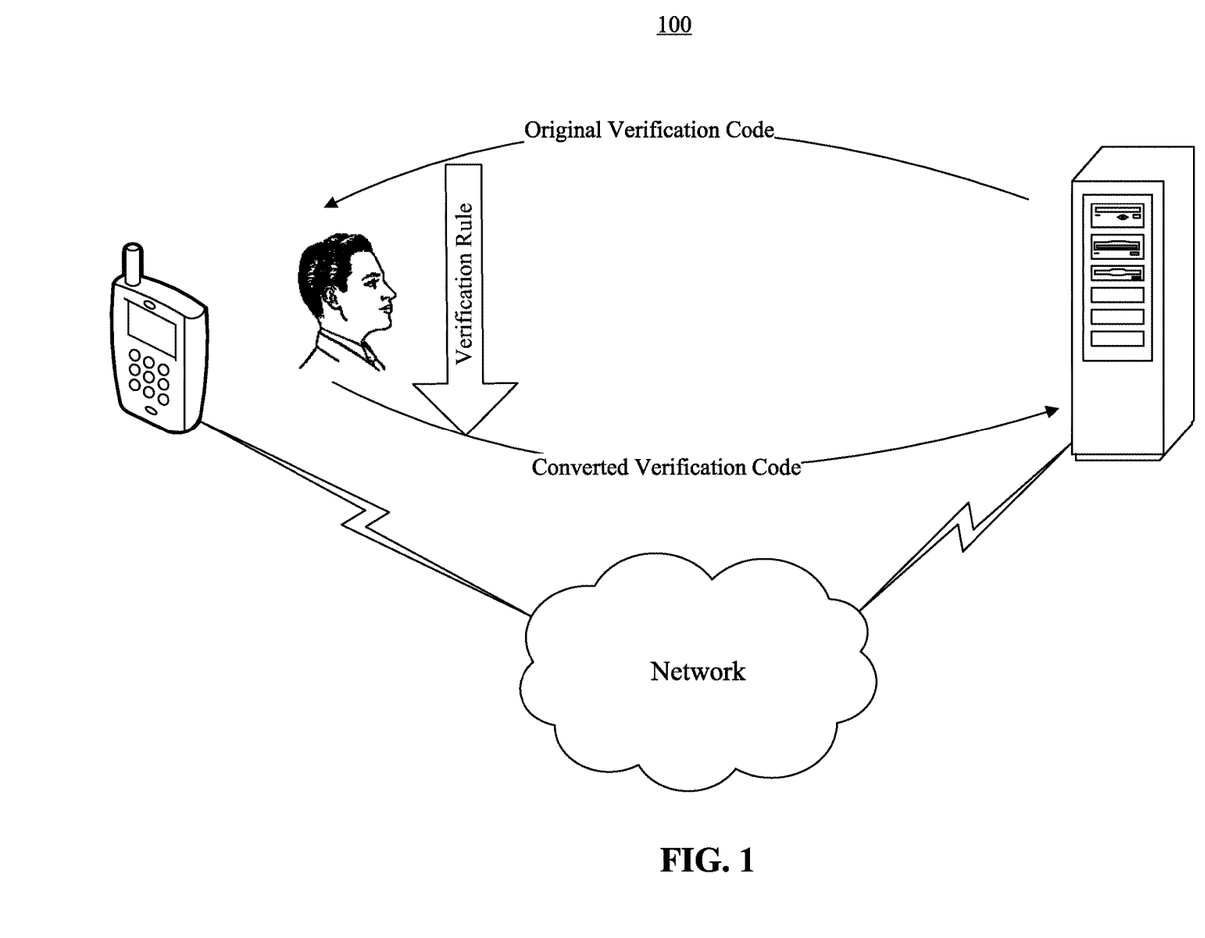
FIG. 1 illustrates an exemplary system environment for implementing methods and apparatuses consistent with the present disclosure.

FIG. 1 illustrates an exemplary system environment 100 for implementing methods and systems consistent with the present disclosure. Referring to FIG. 1, verification processes between a terminal device and a server may be implemented over a network, such as the Internet. During the process of verification, a user may not directly input an original verification code provided by the server. Instead, according to a verification rule negotiated with an application server, the user may return to the server, through the terminal device, a converted verification code acquired according to the verification rule. As a malicious third party does not have knowledge of the verification rule, the third party cannot complete the security verification by acquiring the original verification code. As such, the embodiment of the present application may provide the benefit of improving reliability and security of the verification process.

Figure 2:
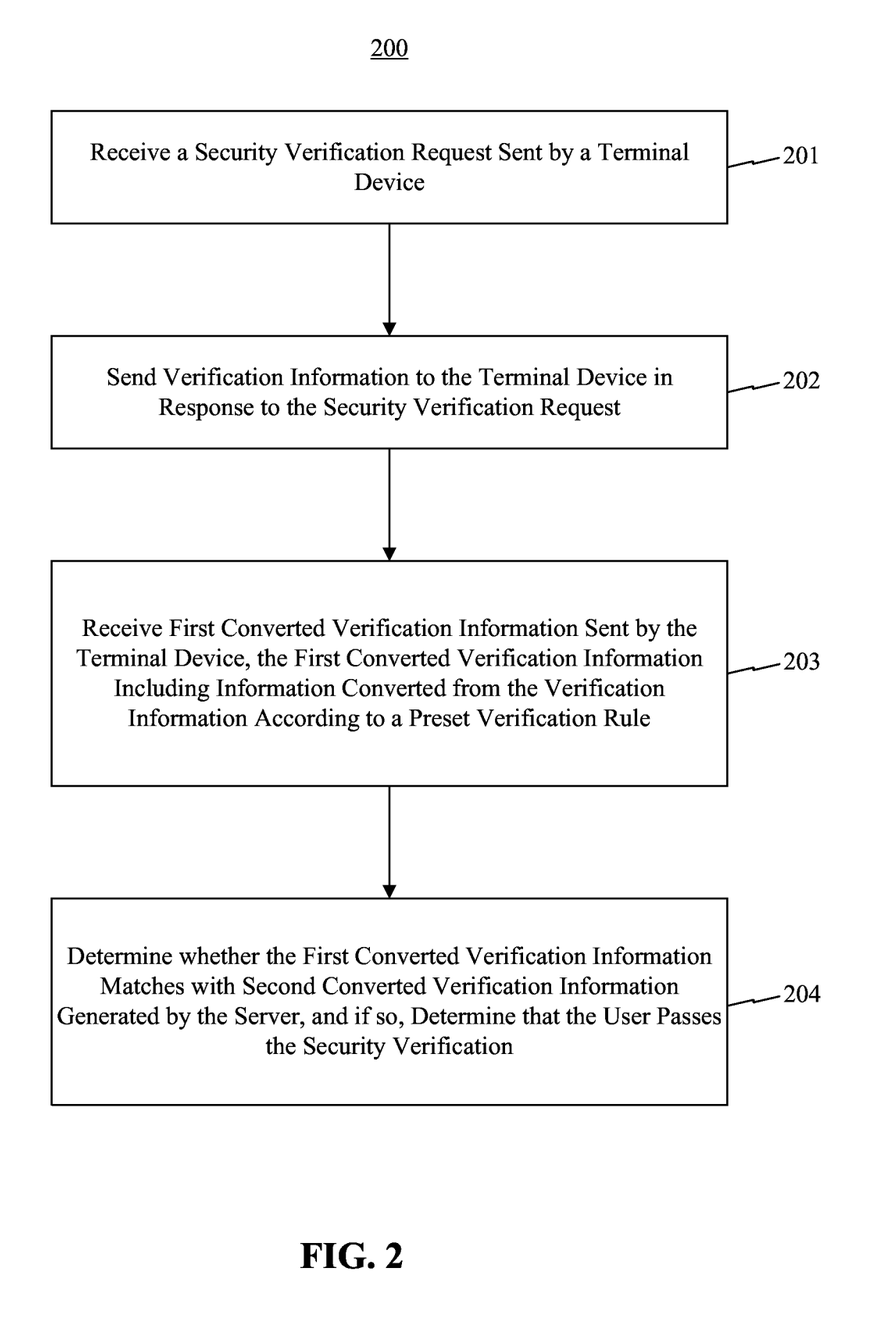
FIG. 2 is a flowchart of an exemplary security verification method, consistent with some embodiments of this disclosure.

FIG. 2 is a flowchart of an exemplary security verification method 200, consistent with some embodiments of this disclosure. The method 200 may be performed by a server for implementing a security verification process. Referring to FIG. 2, the method 200 includes the following steps.

In step 201, the server may receive a security verification request sent by a terminal device. For example, when a user accesses a network application through a client application installed on a terminal device, the user may enter a client interface of the network application. When performing security verification in the client interface, the user may click a security verification request option on the client interface, and send a security verification request to the server through the terminal device.

In step 202, the server may send verification information to the terminal device in response to the security verification request. For example, after receiving the security verification request, the server may randomly generate a verification code of several digits, e.g., six digits of numerals, as the verification information. The server may send the verification information to the terminal device in a text message, an email, an instant messaging, or the like.

In step 203, the server may receive first converted verification information sent by the terminal device. The first converted verification information may include information input to the terminal device by a user that is converted from the received verification information according to a preset verification rule.

In some embodiments, during registration, the user may negotiate in advance, with the server through the terminal device, a verification rule for converting the verification information. The server may negotiate different verification rules with different users, and store a corresponding relation between a user name and a verification rule.

During negotiation of the verification rule, the user may actively set the verification rule. For example, the user may input the verification rule on the terminal device, and the terminal device may send the verification rule to the server. The server may subsequently store a corresponding relation between a user name of the user and the verification rule. As another example, the server may transmit a plurality of verification rules to the terminal device, the terminal device may present the verification rules to the user through a display interface, and the user may select one verification rule from the presented verification rules. The terminal device may then send the selection result to the server, and the server may subsequently store a corresponding relation between a user name of the user and the verification rule.

In some embodiments, the verification rule may be set as a mathematic operational rule. For example, a user may perform calculation on a numeral verification code in the verification information according to a preset mathematic operational rule, and the converted verification information may be the numerical result acquired through calculation. In other embodiments, the verification rule may be set as a sequence rule. For example, a user may perform sequence adjustment on the numeral verification code in the verification information to generate converted verification information. In other embodiments, the verification rule may be set as an extraction rule. For example, a user may extract information from the verification code in the verification information according to a preset extraction rule, and the converted verification information may be the extracted verification code.

In step 204, the server may determine whether the first converted verification information matches with second converted verification information that is generated by the server, and if so, determine that the user passes security verification. The server may generate the second converted verification information by converting the verification information according to the preset verification rule.

In some embodiments, the server may convert the verification information according to the negotiated verification rule to generate second converted verification information, before sending the verification information to the terminal device. The server may buffer the second converted verification information. When the first converted verification information sent by the terminal device is received, the server may acquire the second converted verification information from a cache, and compare the second converted verification information with the first converted verification information. In other embodiments, the server may, after receiving the first converted verification information sent by the terminal device, convert the verification information according to the negotiated verification rule to generate second converted verification information. When converting the verification information, the server may retrieve a user name based on the security verification request, search for a correspondence between the user name and a verification rule, acquire the verification rule corresponding to the retrieved user name, and convert the verification information by using the verification rule.

In the method 200, since the terminal device uses a verification rule negotiated with a server to perform security verification, a malicious third party cannot acquire the verification rule by intercepting the verification information, and would not complete the security verification successfully even acquiring the verification code. By using the converted verification information for security verification, the method 200 provides the benefit of improving the reliability of the security verification and enhancing the security of network applications.

Figure 3:
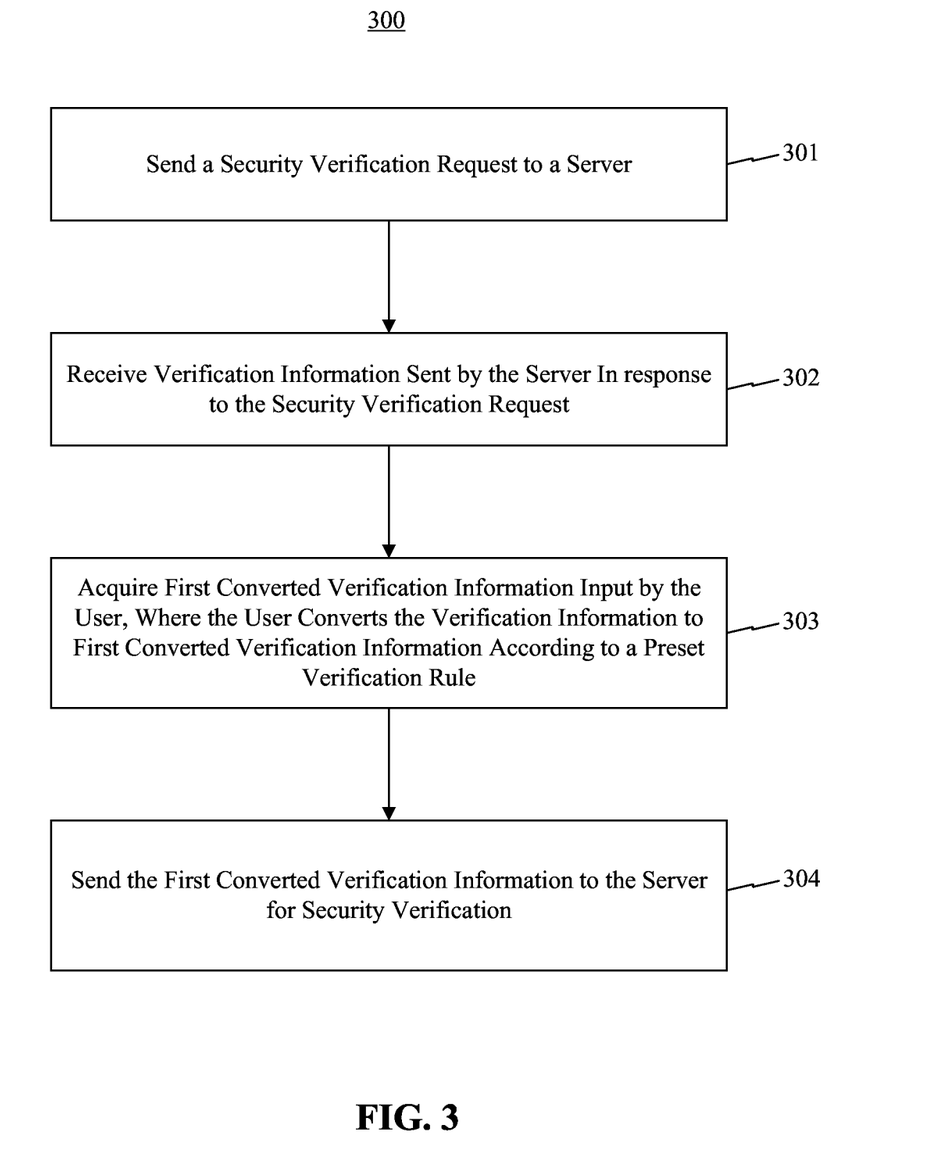
FIG. 3 is a flowchart of another exemplary security verification method, consistent with some embodiments of this disclosure.

FIG. 3 is a flowchart of another exemplary security verification method 300, consistent with some embodiments of this disclosure. The method 300 may be performed by a terminal device for implementing a security verification process. Referring to FIG. 3, the method 300 includes the following steps.

In step 301, the terminal device may send a security verification request to a server.

In step 302, the terminal device may receive verification information sent by the server in response to the security verification request.

In step 303, the terminal device may acquire first converted verification information input by the user, where the user converts the verification information to first converted verification information according to a preset verification rule.

In step 304, the terminal device may send the first converted verification information to the server for security verification. After receiving first converted verification information, the server may determine whether the first converted verification information matches with second converted verification information that is generated by the server, and if so, determine that the user passes security verification. The second converted verification information may be generated by the server converting the verification information according to the preset verification rule.

Figure 4:
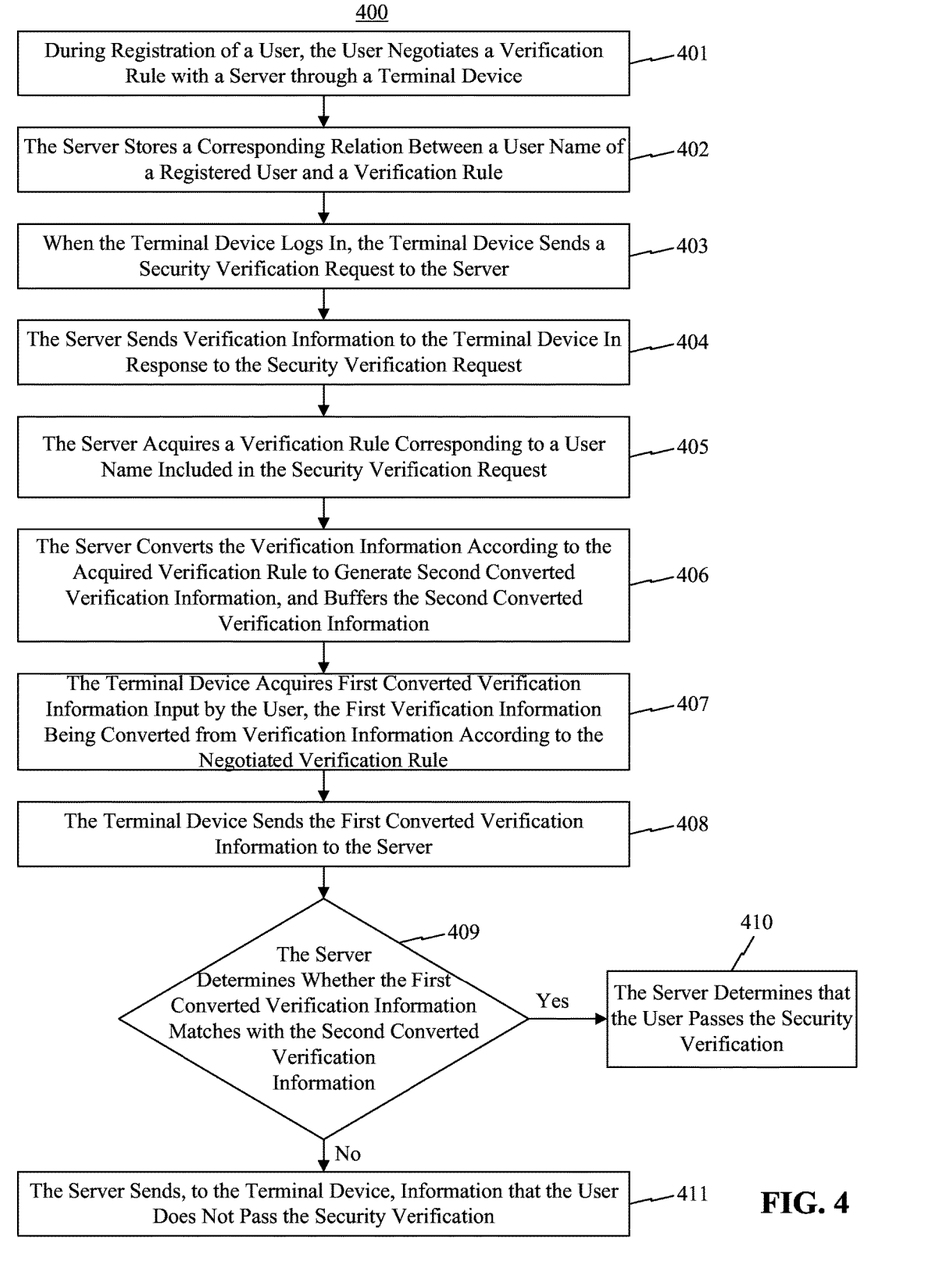
FIG. 4 is a flowchart of another exemplary security verification method, consistent with some embodiments of this disclosure.

FIG. 4 is a flowchart of another exemplary security verification method 400, consistent with some embodiments of this disclosure. The method 400 describes a security verification process through exchange between a server and a terminal device. Referring to FIG. 4, the method 400 includes the following steps.

In step 401, during registration of a user, the user may negotiate a verification rule with a server through a terminal device. During negotiation of the verification rule, the user may actively set the verification rule. For example, the user may input the verification rule on the terminal device, and the terminal device may then send the verification rule to the server. As another example, the server may transmit a plurality of verification rules to the terminal device, and the terminal device may present the plurality of verification rules to the user through a display interface. The user may select one verification rule from the plurality of verification rules, and the terminal device may then send the selection result to the server.

In some embodiments, the verification rule may be a preset mathematic operational rule, which requires a user to perform calculation on a numeral verification code in the verification information and acquire a numerical result as the converted verification information. For example, the verification information may include numeral verification codes formed by a sequence of numbers, such as "476025". When the mathematic operational rule is set to "add 2 to each of the numeral verification codes", the converted verification information acquired through calculation is "698247" according to the rule. When the mathematic operational rule is set to "multiply every two numeral verification codes", the converted verification information acquired through calculation is "280010" according to the rule. That is, multiplying the first numeral verification code "4" with the second numeral verification code "7" results in "28" as the first two numeral codes in the converted verification information, multiplying the third numeral verification code "6" with the fourth numeral verification code "0" results in "00" as the third and fourth numeral codes in the converted verification information, and multiplying the second last numeral verification code "2" with the last numeral verification code "5" results in "10" as the last two numeral codes in the converted verification information.

In some embodiments, the verification rule may be a preset sequence rule, which requires a user to adjust a numeral verification code in the verification information and acquire an adjusted sequence as the converted verification information. For example, the verification information may include numeral verification codes formed by a sequence of numbers, such as "476025". When the preset sequence rule is set as "arranging the numeral verification codes reversely", the converted verification information acquired through calculation is "520674" according to the rule.

In some embodiments, the verification rule may be a preset extraction rule, which requires a user to extraction a numeral verification code in the verification information and acquire an extracted verification code as the converted verification information. For example, the verification information may include numeral verification codes formed by a sequence of numbers, such as "476025". When the extraction rule is set as "extracting even digits of the original numeral verification codes", the converted verification information acquired through calculation is "705" according to the rule.

It should be noted that, the above described verification rules are merely examples for implementing the embodiments, and other verification rules may be used without departing from the spirit and the scope of the present disclosure.

In step 402, the server may store a corresponding relation between a user name of a registered user and a verification rule.

In step 403, the terminal device may send a security verification request to the server when the terminal device logs onto a server network. For example, the user may enter a client interface of a network application through a client application installed on the terminal device for accessing the network application. When performing security verification in the client interface, e.g., performing security verification for conducting online transaction, the user may select a security verification request option on the client interface, and send the security verification request to the server through the terminal device.

In step 404, the server may send verification information to the terminal device in response to the security verification request. After receiving the security verification request, the server may randomly generate verification codes of several digits, such as six digits of numerals, to be included in the verification information. The server may send the verification information to the terminal device in a text message, an email, an instant messaging, or the like.

In step 405, the server may search for a corresponding relation based on a user name included in the security verification request, and acquire a verification rule corresponding to the user name.

In step 406, the server may convert the verification information to generate second converted verification information according to the acquired verification rule, and buffer the second converted verification information.

In step 407, the terminal device may acquire first converted verification information input by the user, where the first converted verification information is converted from the verification information according to the negotiated verification rule.

For example, after receiving the verification information, the terminal device may present the verification information on a display interface. As the user has negotiated the verification rule with the server, the user may convert the verification information to acquire converted verification information according to the verification rule, and input the converted verification information in a verification information input interface.

In step 408, the terminal device may send the first converted verification information to the server.

In step 409, the server may determine whether the first converted verification information matches with the second converted verification information. If the first converted verification information matches with the second converted verification information, the server may perform step 410. Otherwise, the server may perform step 411.

In step 410, the server determines that the user passes the security verification, and end the verification process.

In step 411, the server may send, to the terminal device, information that the user does not pass the security verification, and end the verification process.

In the method 400, since the terminal device uses a verification rule negotiated with a server to perform security verification, a malicious third party cannot acquire the verification rule by intercepting the verification information, and would not complete the security verification successfully even acquiring the verification code. By using the converted verification information for security verification, the method 400 provides the benefit of improving the reliability of the security verification and enhancing the security of network applications.

Figure 5:
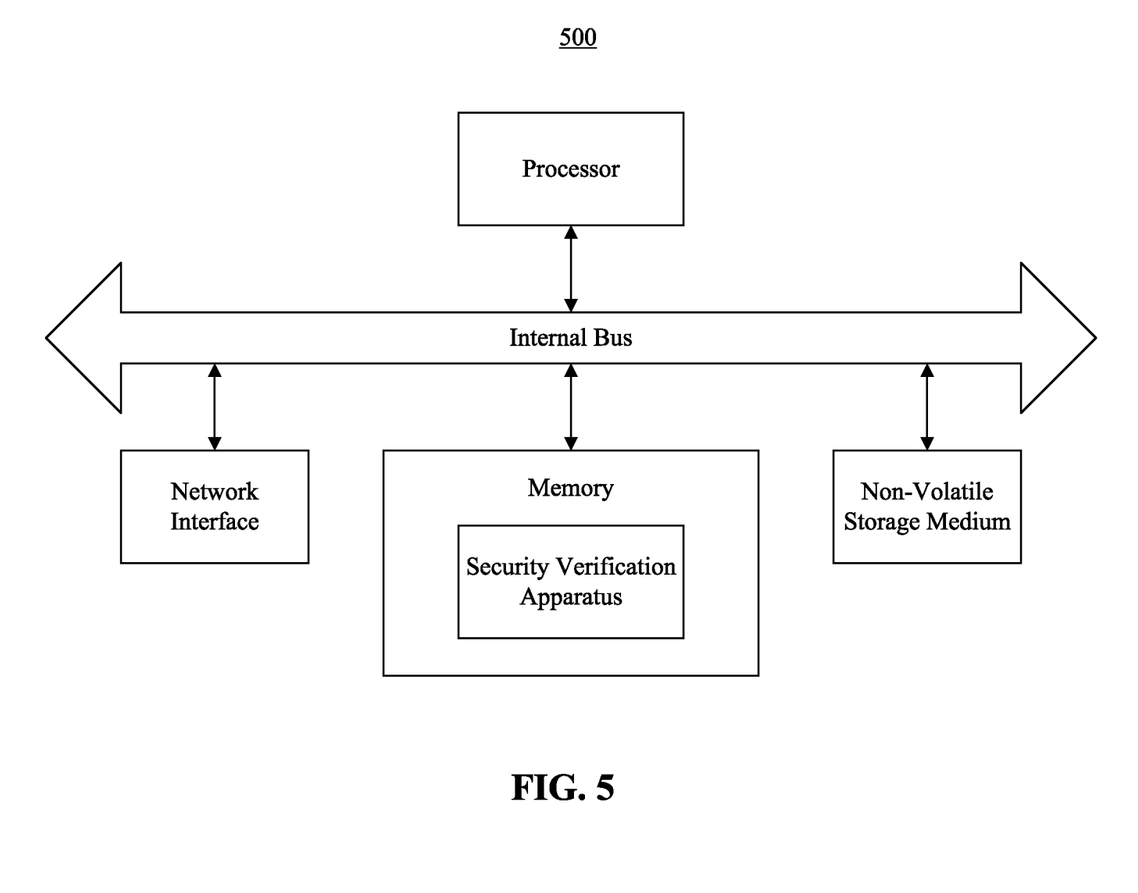
FIG. 5 is a block diagram of an exemplary device, consistent with some embodiments of this disclosure.

FIG. 5 is a block diagram of an exemplary device 500, consistent with some embodiments of this disclosure. The device 500 may be implemented to be a part or all of a server or a terminal device. Referring to FIG. 5, the device 500 includes a security verification apparatus, a processor, a memory, a network interface and a non-volatile storage medium. The memory may be configured to store programs and modules, such as a security verification apparatus when it is implemented by means of software. The person skilled in the art should appreciate that the structure of the device 500 as shown in FIG. 5 does not intend to limit the device 500. The device 500 may include more or less components or combine some components or other different components. For example, the device 500 may be implemented to be a terminal device, and may include a camera, a touch screen, a communication component and the like. As another example, the device 500 may be implemented to be a server, and may include a forwarding chip for processing packets and the like.

Figure 6:
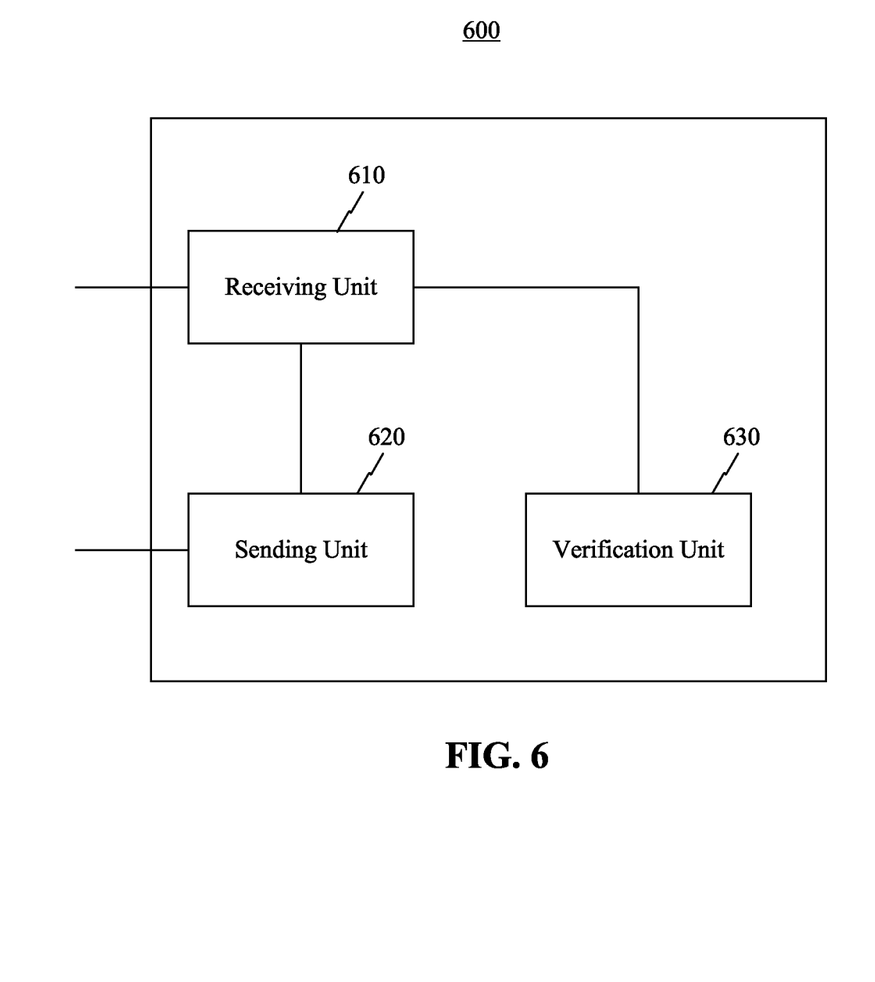
FIG. 6 is a block diagram of an exemplary security verification apparatus, consistent with some embodiments of this disclosure.

FIG. 6 is a block diagram of an exemplary security verification apparatus 600, consistent with some embodiments of this disclosure. The security verification apparatus 600 may be implemented to be a part or all of a server by means of software, or hardware, or a combination of both. When implemented through software, the security verification apparatus 600 may be stored in a non-transitory computer-readable storage medium as computer program instruction, such that a processor of the server may read the corresponding computer program instruction in the non-volatile storage medium to a memory for executing the instruction.

Referring to FIG. 6, the security verification apparatus 600 includes a receiving unit 610, a sending unit 620, and a verification unit 630.

The receiving unit 610 is configured to receive a security verification request sent by a terminal device.

The sending unit 620 is configured to send verification information to the terminal device in response to the security verification request.

The receiving unit 610 is further configured to receive first converted verification information sent by the terminal device, where the first converted verification information is converted from the verification information by a user according to a preset verification rule.

The verification unit 630 is configured to determine whether the first converted verification information matches with second converted verification information generated by the server, and if so, determine that the user passes the security verification. The second converted verification information is generated by the server converting the verification information according to the preset verification rule.

Figure 7:
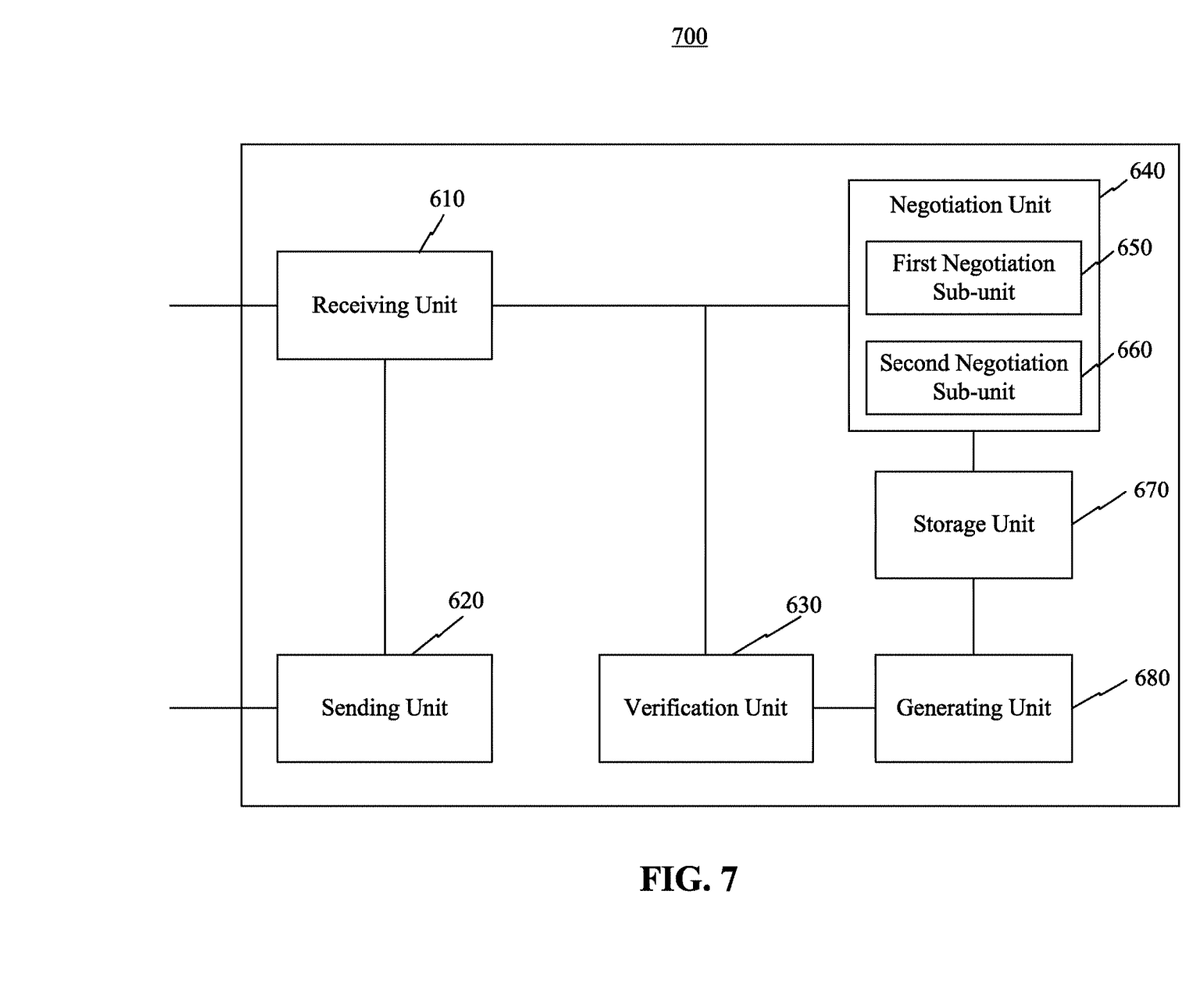
FIG. 7 is a block diagram of another exemplary security verification apparatus, consistent with some embodiments of this disclosure.

FIG. 7 is a block diagram of another exemplary security verification apparatus 700, consistent with some embodiments of this disclosure. As shown in FIG. 7, in addition to the receiving unit 610, sending unit 620, and verification unit 630, the security verification apparatus 700 may further include a negotiation unit 640 and a storage unit 670. The negotiation unit 640 may be configured to negotiate the verification rule with the terminal device during registration of the user, and the storage unit 670 may be configured to store a corresponding relation between a user name of the user and the verification rule. The second converted verification information may be generated after searching the corresponding relation in the storage unit 670 and acquiring a verification rule which corresponds to the user name included in the security verification request.

Further, the negotiation unit 640 may include at least one of a first negotiation sub-unit 650 and a second negotiation sub-unit 660. The first negotiation sub-unit 650 may be configured to receive a verification rule set by the user and transmitted by the terminal device, and use the verification rule set by the user as the negotiated verification rule. The second negotiation sub-unit 660 may be configured to transmit a plurality of verification rules to the terminal device, and use a verification rule sent by the terminal device as the negotiated verification rule, where the verification rule sent by the terminal device is a verification rule selected by the user from the plurality of verification rules.

Referring to FIG. 7, the security verification apparatus 700 may further include a generating unit 680. The generating unit 680 may be configured to, before the sending unit 620 sends the verification information to the terminal device, convert the verification information according to the verification rule to generate the second converted verification information, and buffer the second converted verification information. Alternatively, the generating unit 680 may be configured to convert the verification information according to the verification rule to generate the second converted verification information, after the receiving unit 610 receives the first converted verification information sent by the terminal device.

In some embodiments, the verification rule may include a preset mathematic operational rule, which requires calculation on a numeral verification code in the verification information to generate a numerical result. The verification rule may also include a preset sequence rule, which requires adjusting a sequence order of a verification code in the verification information. The verification rule may also include a preset extraction rule, which requires extracting information from a verification code in the verification information.

Figure 8:
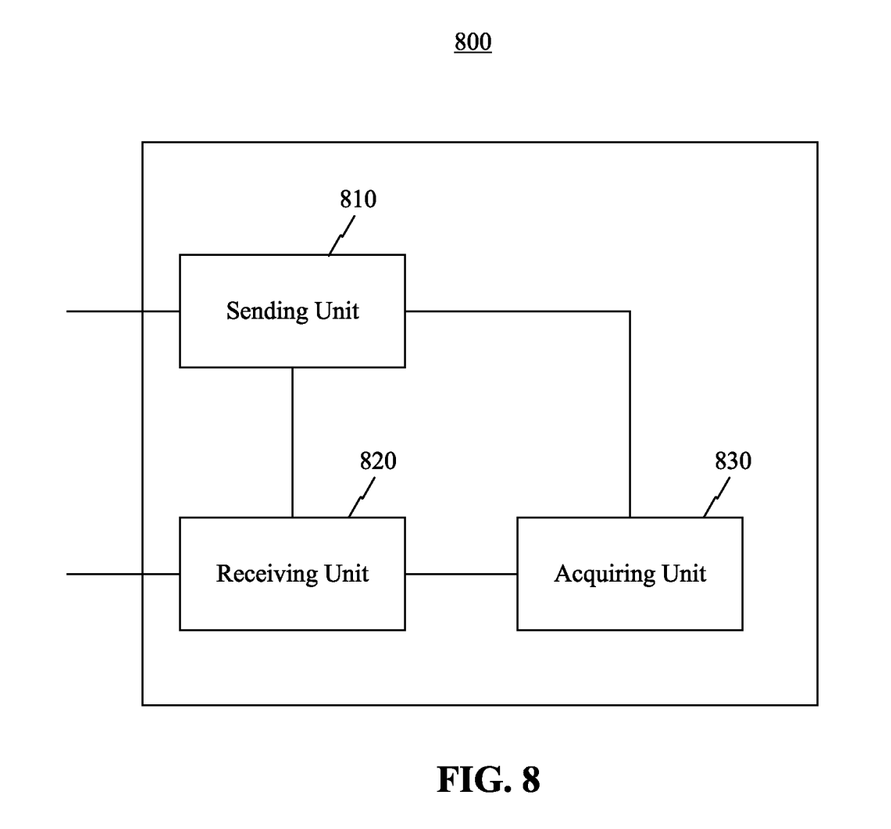
FIG. 8 is a block diagram of another exemplary security verification apparatus, consistent with some embodiments of this disclosure.

FIG. 8 is a block diagram of another exemplary security verification apparatus 800, consistent with some embodiments of this disclosure. The security verification apparatus 800 may be implemented to be a part or all of a terminal device by means of software, or hardware, or a combination of both. When implemented through software, the security verification apparatus 800 may be stored in a non-transitory computer-readable storage medium as computer program instruction, such that a processor of the terminal device may read the corresponding computer program instruction in the non-volatile storage medium to a memory for executing the instruction.

Referring to FIG. 8, the security verification apparatus 800 includes a sending unit 810, a receiving unit 820, and an acquiring unit 830. The sending unit 810 is configured to send a security verification request to a server. The receiving unit 820 is configured to receive verification information sent by the server in response to the security verification request. The acquiring unit 830 is configured to acquire a first converted verification information input by the user, where the user converts the verification information according to a preset verification rule.

The sending unit 810 is further configured to send the first converted verification information to a server. The server may determine whether the first converted verification information matches with second converted verification information generated by the server, and if so, determine that the user passes the security verification. The server may generate the second converted verification information by converting the verification information according to the verification rule.

Figure 9:
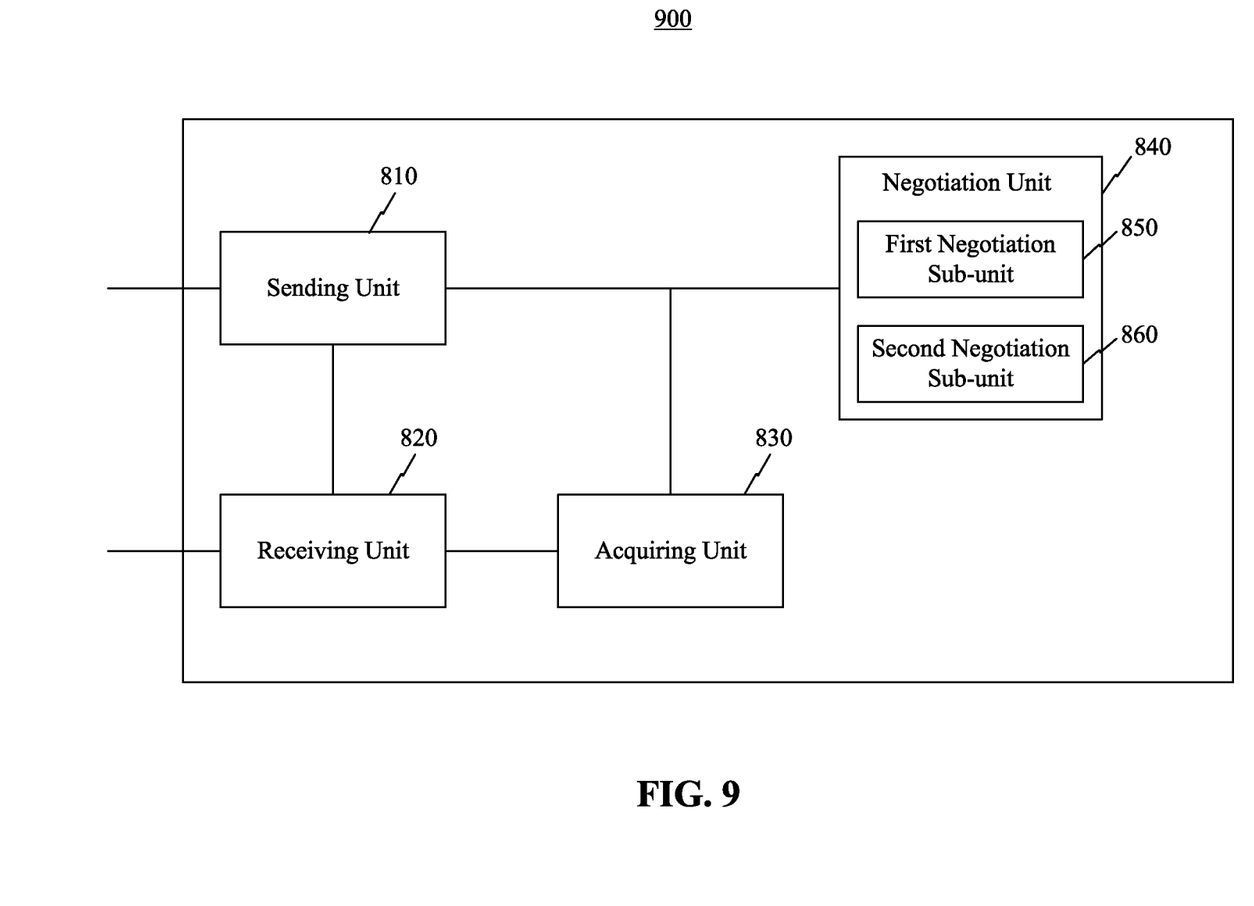
FIG. 9 is a block diagram of another exemplary security verification apparatus, consistent with some embodiments of this disclosure.

FIG. 9 is a block diagram of another exemplary security verification apparatus 900, consistent with some embodiments of this disclosure. As shown in FIG. 9, in addition to the sending unit 810, receiving unit 820, and acquiring unit 830, the security verification apparatus 900 may further include a negotiation unit 840. The negotiation unit 840 may be configured to negotiate the verification rule with the server during registration of the user. The server may then store a corresponding relation between a user name of the user and the verification rule.

Further, the negotiation unit 840 may include at least one of a first negotiation sub-unit 850 and a second negotiation sub-unit 860. The first negotiation sub-unit 850 may be configured to transmit to the server a verification rule set by the user, and use the verification rule set by the user as the negotiated verification rule. The second negotiation sub-unit 860 may be configured to receive a plurality of verification rules transmitted by the server, use a verification rule selected by the user from the plurality of verification rules as the negotiated verification rule, and send the negotiated verification rule to the server.

In exemplary embodiments, a non-transitory computer-readable storage medium including instructions is also provided, and the instructions may be executed by a device (such as a terminal device, a server, a personal computer, or the like), for performing the above-described methods. For example, the non-transitory computer-readable storage medium may be read-only memory (ROM), random access memory (RAM), CD-ROM, magnetic tape, floppy disk and optical data storage device, etc.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

One of ordinary skill in the art will understand that the above described embodiments can be implemented by hardware, or software (program codes), or a combination of hardware and software. If implemented by software, it may be stored in the above-described computer-readable media. The software, when executed by the processor can perform the disclosed methods. The computing units and the other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A security verification method, comprising:
negotiating a preset verification rule with a terminal device during a registration of a user, wherein negotiating the preset verification rule with the terminal device comprises:
transmitting a plurality of verification rules to the terminal device;
receiving a selected verification rule from the terminal device, wherein the selected verification rule is selected by the user from the plurality of verification rules; and
using the selected verification rule as a preset verification rule;
receiving a security verification request from the terminal device;
sending verification information to the terminal device in response to the security verification request;
receiving first converted verification information from the terminal device, wherein the first converted verification information is generated by converting the verification information according to the preset verification rule, and wherein the verification information includes a sequence formed by a plurality of numeral verification codes, and the preset verification rule comprises a sequence rule for modifying a sequence order of one or more numeral verification codes in the sequence, the sequence rule being set by a user via the terminal device and received from the terminal device during the registration of the user, and wherein the preset verification rule comprises a mathematic operational rule, and the mathematic operational rule includes calculating a numerical result based on one or more numeral verification codes in the verification information;
determining whether the first converted verification information matches with second converted verification information, wherein the second converted verification information is generated by converting the verification information according to the preset verification rule; and
determining that a user associated with the terminal device passes security verification if the first converted verification information matches with the second converted verification information.

2. The method of claim 1, further comprising:
storing a corresponding relation between a user name of the user and the preset verification rule;
wherein the second converted verification information is generated after acquiring the preset verification rule based on the user name included in the security verification request and the corresponding relation.

3. The method of claim 1, further comprising:
before sending the verification information to the terminal device, converting the verification information according to the preset verification rule to generate the second converted verification information, and storing the second converted verification information.

4. A security verification method, comprising:
negotiating a preset verification rule with a server during a registration of a user, wherein negotiating the preset verification rule with the server comprises:
receiving a plurality of verification rules from the server;
using a selected verification rule selected by the user from the plurality of verification rules as the preset verification rule; and
sending the selected verification rule to the server;
sending a security verification request to the server;
receiving verification information from the server;
acquiring first converted verification information, wherein the first converted verification information is generated by converting the verification information according to the preset verification rule, and wherein the verification information includes a sequence formed by a plurality of numeral verification codes, and the preset verification rule comprises a sequence rule for modifying a sequence order of one or more numeral verification codes in the sequence, the sequence rule being set by the user via a terminal device and received from the terminal device during the registration of the user, and wherein the preset verification rule comprises a mathematic operational rule, and the mathematic operational rule includes calculating a numerical result based on one or more numeral verification codes in the verification information; and
sending the first converted verification information to the server for determining whether a user passes security verification.

5. A security verification apparatus, the apparatus comprising:
a negotiation unit configured to negotiate a preset verification rule with a terminal device during a registration of a user, wherein the negotiation unit comprises a negotiation sub-unit configured to:
transmit a plurality of verification rules to the terminal device,
receive a selected verification rule from the terminal device, wherein the selected verification rule is selected by the user from the plurality of verification rules, and
use the selected verification rule as the preset verification rule;
a receiving unit configured to receive a security verification request from the terminal device;
a sending unit configured to send verification information to the terminal device in response to the security verification request;
wherein the receiving unit is further configured to receive first converted verification information from the terminal device, and the first converted verification information is generated by converting the verification information according to the preset verification rule, and wherein the verification information includes a sequence formed by a plurality of numeral verification codes, and the preset verification rule comprises a sequence rule for modifying a sequence order of one or more numeral verification codes in the sequence, the sequence rule being set by the user via the terminal device and received from the terminal device during the registration of the user, and wherein the preset verification rule comprises a mathematic operational rule, and the mathematic operational rule includes calculating a numerical result based on one or more numeral verification codes in the verification information; and a verification unit configured to:
   determine whether the first converted verification information matches with second converted verification information, wherein the second converted verification information is generated by converting the verification information according to the preset verification rule; and
   determine that a user associated with the terminal device passes security verification if the first converted verification information matches with the second converted verification information.

6. The apparatus of claim 5, further comprising:
a storage unit configured to store a corresponding relation between a user name of the user and the preset verification rule;
wherein the second converted verification information is generated after acquiring the preset verification rule based on the user name included in the security verification request and the corresponding relation.

7. The apparatus of claim 5, further comprising:
a generating unit configured to, before the sending unit sends the verification information to the terminal device, convert the verification information according to the preset verification rule to generate the second converted verification information, and store the second converted verification information.

8. A security verification apparatus, comprising:
a negotiation unit configured to negotiate a preset verification rule with a server during a registration of a user, wherein the negotiation unit comprises a negotiation sub-unit configured to receive a plurality of verification rules transmitted from the server, use a selected verification rule selected by the user from the plurality of verification rules as the preset verification rule, and send the selected verification rule to the server;
a sending unit configured to send a security verification request to the server;
a receiving unit configured to receive verification information from the server;
an acquiring unit configured to acquire first converted verification information, wherein the first converted verification information is generated by converting the verification information according to the preset verification rule, and wherein the verification information includes a sequence formed by a plurality of numeral verification codes, and the preset verification rule comprises a sequence rule for modifying a sequence order of one or more numeral verification codes in the sequence, the sequence rule being set by the user via a terminal device and received from the terminal device during the registration of the user, and wherein the preset verification rule comprises a mathematic operational rule, and the mathematic operational rule includes calculating a numerical result based on one or more numeral verification codes in the verification information;
wherein the sending unit is further configured to send the first converted verification information to the server for determining whether a user passes security verification.

9. A non-transitory computer readable medium that stores a set of instructions that is executable by at least one processor of a server to cause the server to perform a security verification method, the security verification method comprising:
   negotiating a preset verification rule with a terminal device during a registration of a user, wherein negotiating the preset verification rule with the terminal device comprises:
      transmitting a plurality of verification rules to the terminal device;
      receiving a selected verification rule from the terminal device, wherein the selected verification rule is selected by the user from the plurality of verification rules; and
      using the selected verification rule as a preset verification rule;
   receiving a security verification request from the terminal device;
   sending verification information to the terminal device in response to the security verification request;
   receiving first converted verification information from the terminal device, wherein the first converted verification information is generated by converting the verification information according to the preset verification rule, and wherein the verification information includes a sequence formed by a plurality of numeral verification codes, and the preset verification rule comprises a sequence rule for modifying a sequence order of one or more numeral verification codes in the sequence, the sequence rule being set by the user via the terminal device and received from the terminal device during the registration of the user, and wherein the preset verification rule comprises a mathematic operational rule, and the mathematic operational rule includes calculating a numerical result based on one or more numeral verification codes in the verification information;
   determining whether the first converted verification information matches with second converted verification information, wherein the second converted verification information is generated by converting the verification information according to the preset verification rule; and
   determining that a user associated with the terminal device passes security verification if the first converted verification information matches with the second converted verification information.

10. The non-transitory computer readable medium according to claim 9, wherein the set of instructions that is executable by the at least one processor of the server to cause the server to further perform:
   storing a corresponding relation between a user name of the user and the preset verification rule;
   wherein the second converted verification information is generated after acquiring the preset verification rule based on the user name included in the security verification request and the corresponding relation.

11. The non-transitory computer readable medium according to claim 9, wherein the set of instructions that is executable by the at least one processor of the server to cause the server to further perform:
   before sending the verification information to the terminal device, converting the verification information according to the preset verification rule to generate the second converted verification information, and storing the second converted verification information.

12. A non-transitory computer readable medium that stores a set of instructions that is executable by at least one processor of a terminal device to cause the terminal device to perform a security verification method, the security verification method comprising:

negotiating a preset verification rule with a server during a registration of a user, wherein negotiating the preset verification rule with the server comprises:
receiving a plurality of verification rules from the server;
using a selected verification rule selected by the user from the plurality of verification rules as the preset verification rule; and
sending the selected verification rule to the server;
sending a security verification request to the server;
receiving verification information from the server;
acquiring first converted verification information, wherein the first converted verification information is generated by converting the verification information according to the preset verification rule, and wherein the verification information includes a sequence formed by a plurality of numeral verification codes, and the preset verification rule comprises a sequence rule for modifying a sequence order of one or more numeral verification codes in the sequence, the sequence rule being set by the user via the terminal device and received from the terminal device during the registration of the user, and wherein the preset verification rule comprises a mathematic operational rule, and the mathematic operational rule includes calculating a numerical result based on one or more numeral verification codes in the verification information; and
sending the first converted verification information to the server for determining whether a user passes security verification.

* * * * *

UNITED STATES PATENT AND TRADEMARK OFFICE
CERTIFICATE OF CORRECTION

PATENT NO. : 10,284,565 B2
APPLICATION NO. : 14/817574
DATED : May 7, 2019
INVENTOR(S) : Yanping Wu Page 1 of 1

It is certified that error appears in the above-identified patent and that said Letters Patent is hereby corrected as shown below:

On the Title Page

Item (30), "201410381484" should read as --201410381484.9--

Signed and Sealed this
Seventeenth Day of September, 2019

Andrei Iancu
*Director of the United States Patent and Trademark Office*